United States Patent
Naik et al.

(10) Patent No.: US 9,106,546 B1
(45) Date of Patent: Aug. 11, 2015

(54) EXPLICIT CONGESTION NOTIFICATION IN MIXED FABRIC NETWORK COMMUNICATIONS

(75) Inventors: Ashish Naik, Los Altos, CA (US);
Junlan Zhou, Sunnyvale, CA (US);
Philip Michael Wells, Madison, WI (US)

(73) Assignee: Google Inc., Mountain View, CA (US)

( * ) Notice: Subject to any disclaimer, the term of this patent is extended or adjusted under 35 U.S.C. 154(b) by 265 days.

(21) Appl. No.: 13/559,109

(22) Filed: Jul. 26, 2012

(51) Int. Cl.
*H04L 12/801* (2013.01)

(52) U.S. Cl.
CPC ............... *H04L 47/10* (2013.01); *H04L 47/11* (2013.01)

(58) Field of Classification Search
CPC ........ H04L 47/10; H04L 47/11; H04L 47/127
USPC ....................................... 370/229, 230, 230.1
See application file for complete search history.

(56) References Cited

U.S. PATENT DOCUMENTS

| | | | | |
|---|---|---|---|---|
| 7,573,827 B2 * | 8/2009 | Santos et al. | ................... | 370/242 |
| 7,859,996 B2 * | 12/2010 | Kwan et al. | ................... | 370/229 |
| 8,660,075 B2 * | 2/2014 | Ghanwani et al. | ............ | 370/329 |
| 2007/0133552 A1 * | 6/2007 | Kubo et al. | ................ | 370/395.2 |
| 2011/0299532 A1 * | 12/2011 | Yu et al. | ......................... | 370/392 |
| 2013/0322237 A1 * | 12/2013 | DeCusatis et al. | ............ | 370/230 |

* cited by examiner

*Primary Examiner* — Mohammad Anwar
(74) *Attorney, Agent, or Firm* — Edward A. Gordon; Foley & Lardner LLP

(57) ABSTRACT

A method and apparatus are provided for communicating congestions that area detected in a communications network. According to the method and apparatus, a first Ethernet frame encapsulating a first PDU is transmitted across an Ethernet network. Congestion in the network is then detected, and an indication of the congestion is inserted in a predetermined header field of the first Ethernet frame. Once the first Ethernet frame is received by an endpoint in the network, the indication of congestion is transferred into a second PDU that is associated with the first PDU. The second PDU is then encapsulated in a second Ethernet frame and transmitted towards the sender of the first PDU.

38 Claims, 12 Drawing Sheets

EXPLICIT CONGESTION NOTIFICATION IN MIXED FABRIC NETWORK COMMUNICATIONS

BACKGROUND

Network congestions occur when nodes in a network carry so much traffic that their quality-of-service (QoS) deteriorates. To prevent QoS deteriorations, congestion control mechanisms have been developed as part of many protocols. Different protocols, however, may use different congestion control mechanisms, thus making it difficult for network routers to keep up. For example, a router may support the congestion control mechanism used by a first protocol while failing to support the congestion control mechanism of a second protocol. Because the congestion control of the second protocol is not supported, when the router is congested, traffic of the second protocol may continue to flood the router even though senders of traffic of the first protocol have backed off and are refraining from transmitting data in an attempt to relieve the congestion. Thus, in general, the failure to support the congestion control mechanisms of some protocols while supporting others may decrease the efficiency of the supported congestion control mechanisms.

SUMMARY

In one aspect, a congestion control mechanism is provided that is common to all protocols that use Ethernet as their messaging fabric. According to a method, a first Ethernet frame encapsulating a first protocol data unit (PDU) is transmitted. Congestion in the network is then detected, and an indication of the congestion is inserted in a header field of the first Ethernet frame. The first Ethernet frame is then received by a node in the network, and the indication of congestion is transferred into a second PDU that is associated with the first PDU. The second PDU is then encapsulated in a second Ethernet frame and transmitted towards the sender of the first PDU.

In another aspect, an apparatus for receiving and transmitting data over a communications network is provided. The apparatus includes a transmitter, a receiver, a memory, and a processor coupled to the memory, transmitter and receiver. The receiver is configured to receive a protocol data unit (PDU) that has been transmitted by a source node to a destination node, over the communications network. The memory includes a buffer for storing protocol data units (PDUs), and one or more processor-executable instructions for modifying a predetermined header field of an Ethernet frame to carry indications of congestion in accordance with a congestion notification mechanism. The processor is configured to identify a communications network node located on a path from the source node to the destination node, encapsulate the PDU in an Ethernet frame, the Ethernet frame having a header portion, and detect that an amount of data stored in the buffer exceeds a threshold. Furthermore, the processor is configured to insert an indication of congestion in the predetermined header field of the Ethernet frame, the indication of congestion being inserted by executing the one or more processor-executable instructions, and provide to the transmitter the Ethernet frame for transmission to the identified communications network node. The indication of congestion is inserted in response to detecting the amount of data exceeds a threshold.

The apparatus may be a router and the processor-executable instructions may further be Access Control List (ACL) rules. The predetermined header field may further be a field in a VLAN header of the second Ethernet frame. The receiver and transmitter may further be integrated together in a single transceiver unit. The predetermined header field may further be adapted for use in the congestion notification mechanism through the execution of the one or more processor-executable instructions. The predetermined header field may further be selected for use in the congestion notification mechanism based on not being used in the identification of the communications network node. The predetermined header field may further be designated, in an Ethernet protocol standard used for the transmission of the Ethernet frame by the apparatus, for a use that is unrelated to congestion notification.

In another aspect, an apparatus for receiving and transmitting data over a communications network is provided. The apparatus includes a transmitter, a receiver, and a processor coupled to the receiver and transmitter. The receiver is configured to receive, over the communications network, a first Ethernet frame encapsulating a protocol data unit (PDU) that has been transmitted by a source node to a destination node. The processor is configured to identify a communications network node located on a path from the source node to the destination node and encapsulate the PDU into a second Ethernet frame. The processor is further configured to identify a first header field in the first Ethernet frame that is adapted for use in a congestion notification mechanism and transfer a content of the first header field to a second header field in the second Ethernet frame. The first header filed is of a first type and the second header field is also of the first type. The processor is further configured to provide to the transmitter the Ethernet frame for transmission to the identified communications network node. The first header field in the first Ethernet frame is designated, in an Ethernet protocol standard used in the transmission of the first Ethernet frame and the second Ethernet frame, for a use that is unrelated to congestion notification. The first header field may further be a VLAN PRIORITY header field and the second header field may further be a VLAN PRIORITY header field. The receiver and transmitter may further be integrated together in a single transceiver unit.

The processor may further be configured to determine whether the content of the first header field indicates that a congestion has been detected. The content of the first header field may further be transferred to the second header field only when the content of the first header field indicates that a congestion has been detected. The processor may further be configured to determine whether the identified communications network node and the destination device are the same device. When it is determined that the destination device is the same as the identified communications network node, the processor may transfer the content of the first header field in the first Ethernet frame to a third header field in the second Ethernet frame. The third header field may further be of a second type different from the first type. The content of the first header field may further be transferred to the second header field only when it is determined that the identified communications network node and the destination device are different devices.

The content of the first header field may further be transferred to the second header field regardless of whether the content of the first header field indicates that a congestion has been detected. The first header field may further be adapted for use in the congestion notification mechanism through the execution of the one or more processor-executable instructions by the processor, the instructions being stored in a memory of the apparatus. The first header field may further be selected for use in the congestion notification mechanism based on not being used in the identification of the network node by the processor. Furthermore, only a portion of the first header field may be adapted for use in the congestion notification mechanism.

In yet another aspect, an apparatus for receiving and transmitting data over a communications network is provided. The apparatus includes a transmitter, a receiver, and a processor coupled to the transmitter and receiver. The receiver is configured to receive, over the communications network, a first Ethernet frame encapsulating a first protocol data unit (PDU) of a first protocol that is transmitted by a sending device. The processor is configured to detect an indication of network congestion in a first header field of the first Ethernet frame, obtain a second PDU addressed to the sending device, and transfer the indication of network congestion from the first field of the first Ethernet frame to a second header field of the second PDU. The processor is further configured to encapsulate the second PDU in a second Ethernet frame, and provide to the transmitter the second Ethernet frame for transmission to a next communications network node on a transmission path leading to the sending device. The second PDU is also of the first protocol.

The first header field may further be designated, in an Ethernet protocol standard, for use that is unrelated to congestion notification. The second header field in the second PDU may further be designated, by a standard specification for the first protocol, to carry indications of congestion. The receiver and transmitter may further be integrated together in a single transceiver unit. The processor may further be configured to receive the second PDU and determine that the second PDU is associated with the first PDU, wherein the indication of network congestion is transferred only when it is determined that the second PDU is related to the first PDU. The first protocol may further be the InfiniBand protocol, the first header field of the first Ethernet frame may further be a VLAN header field, and the second header field of the second PDU may further be a Backward Explicit Congestion Notification (BECN) bit field. Obtaining the second PDU may further include generating the second PDU. The second PDU is one of an IniniBand ACK message and an InifiniBand CNP message. The second header field of the second PDU may further be a Backward Explicit Congestion Notification (BECN) bit field.

In yet another aspect, a network interface adapter is provided for receiving and transmitting data over a communications network. The network interface adapter includes logic configured to receive, from a sending device, over the communications network, a first Ethernet frame encapsulating a first protocol data unit (PDU) and detect an indication of network congestion in a first header field of the first Ethernet frame. The logic is further configured to obtain a second PDU addressed to the sending device, transfer the indication of network congestion from the first header field to a second header field in the second PDU, encapsulate the second PDU in a second Ethernet frame, and transmit the second Ethernet frame to a node in the communications network, the node being part of a transmission path leading to the sending device. The first PDU and the second PDU are both of the first protocol.

The first header field may further be designated, in an Ethernet protocol standard, for use that is unrelated to congestion notification. The second header field in the second PDU may further be designated, by a standard specification for the first protocol, to carry indications of congestion. The first protocol may further be the InfiniBand protocol, the first header field of the first Ethernet frame may further be a VLAN header field, and the second header field of the second PDU may further be a Backward Explicit Congestion Notification (BECN) bit field. Obtaining the second PDU may further include generating the second PDU. The second PDU may further be one of an IniniBand ACK message and an InifiniBand CNP message. The second header field of the second PDU may further be a Backward Explicit Congestion Notification (BECN) bit field.

In yet another aspect, a method is provided for transmitting data over a communications network. The method includes receiving, over the communications network, a first Ethernet frame encapsulating a protocol data unit (PDU) that has been transmitted by a source node to a destination node. The method further includes identifying a communications network node located on a path from the source node to the destination node and encapsulating the PDU into a second Ethernet frame. The method further includes identifying a first header field in the first Ethernet frame, the first header field being adapted for use in a congestion notification mechanism, transferring a content of the first header field in the first Ethernet frame to a second header field in the second Ethernet frame, and transmitting the second Ethernet frame to the communications network node. The first header field in the first Ethernet frame is designated, in an Ethernet protocol standard, for a use that is unrelated to congestion notification. The first header field may further be a VLAN PRIORITY header field and the second header field may further be a VLAN PRIORITY header field.

The method may further include determining whether the content of the first header field indicates that congestion has been detected. The content of the first header field may further be transferred to the second header field only when the content indicates that a congestion has been detected. The content of the first header field may further be transferred to the second header field regardless of whether the content indicates that congestion has been detected. The first header field may further be selected for use in the congestion notification mechanism based on not being used in the identification of the network node.

In yet another aspect, a method is provided for receiving and transmitting data over a communications network. The method includes receiving, over the communications network, a first Ethernet frame and detecting an indication of network congestion in a first header field of the first Ethernet frame. The first Ethernet frame encapsulates a first protocol data unit (PDU) of a first protocol, the first PDU being transmitted by a sending device. The method further includes obtaining a second PDU addressed to the sending device and transferring the indication of network congestion from the first header field to a second header field in the second PDU. The method further includes encapsulating the second PDU in a second Ethernet frame, and transmitting the second Ethernet frame to a node in the communications network. The node is part of a transmission path leading to the sending device. The second PDU is also of the first protocol.

The first header field may further be designated, in an Ethernet protocol standard, for use that is unrelated to congestion notification. The second header field in the second PDU may further be designated, by a standard specification for the first protocol, to carry indications of congestion. The first protocol may further be the InfiniBand protocol. The first header field of the first Ethernet frame may further be a VLAN header field. The second header field of the second PDU is a Backward Explicit Congestion Notification (BECN) bit field. Obtaining the second PDU may further include generating the second PDU. The second PDU may further be an InfiniBand ACK message. The second header field of the second PDU may further be a Backward Explicit Congestion Notification (BECN) bit field.

DETAILED DESCRIPTION

Figure 1:
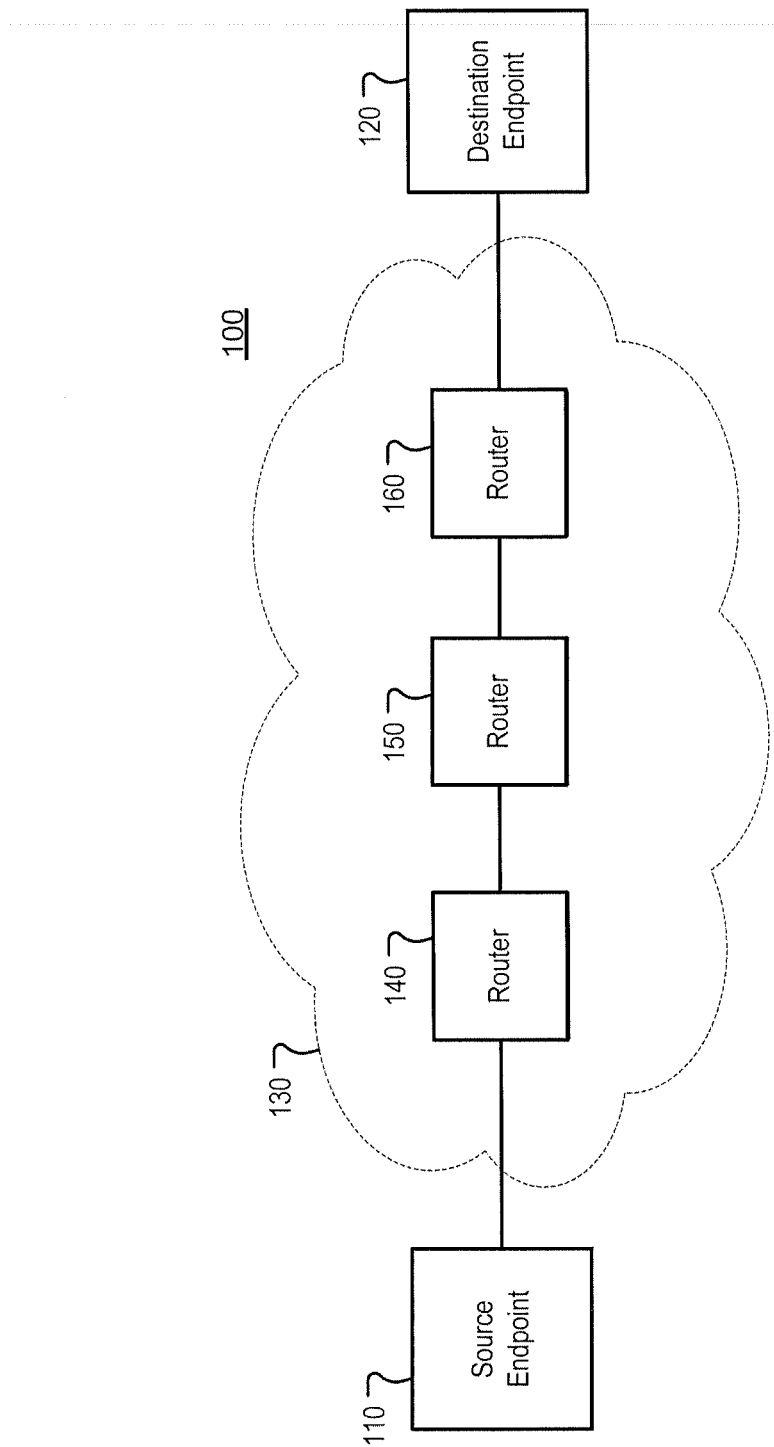
FIG. 1 depicts a schematic diagram of a communications network in accordance with aspects of the disclosure.

FIG. 1 depicts a schematic diagram of a data network 100 in accordance with aspects of the disclosure. The data network 100 may include a source endpoint 110, a destination endpoint 120, and an Ethernet system 130. The source endpoint 110 may be a personal computer, laptop, smart phone, cell phone, video game console, or any other processor-based device. Similarly, the destination endpoint 120 may be a personal computer, laptop, smart phone, cell phone, video game console, or any other processor-based device. The source endpoint 110 may be connected to the destination endpoint 120 via the Ethernet system 130. The Ethernet system 130 may be an Ethernet messaging fabric and it may comprise nodes 140-160. In some aspect, the endpoints 110 and 120 may use the Ethernet system 130 to exchange non-TCP communications. Nodes 140-160 may be routers, bridges, switches, hubs, or any other communications network component that is at least partially compliant with the Ethernet protocol. In the present example, the nodes 140-160 are routers.

Figure 2:
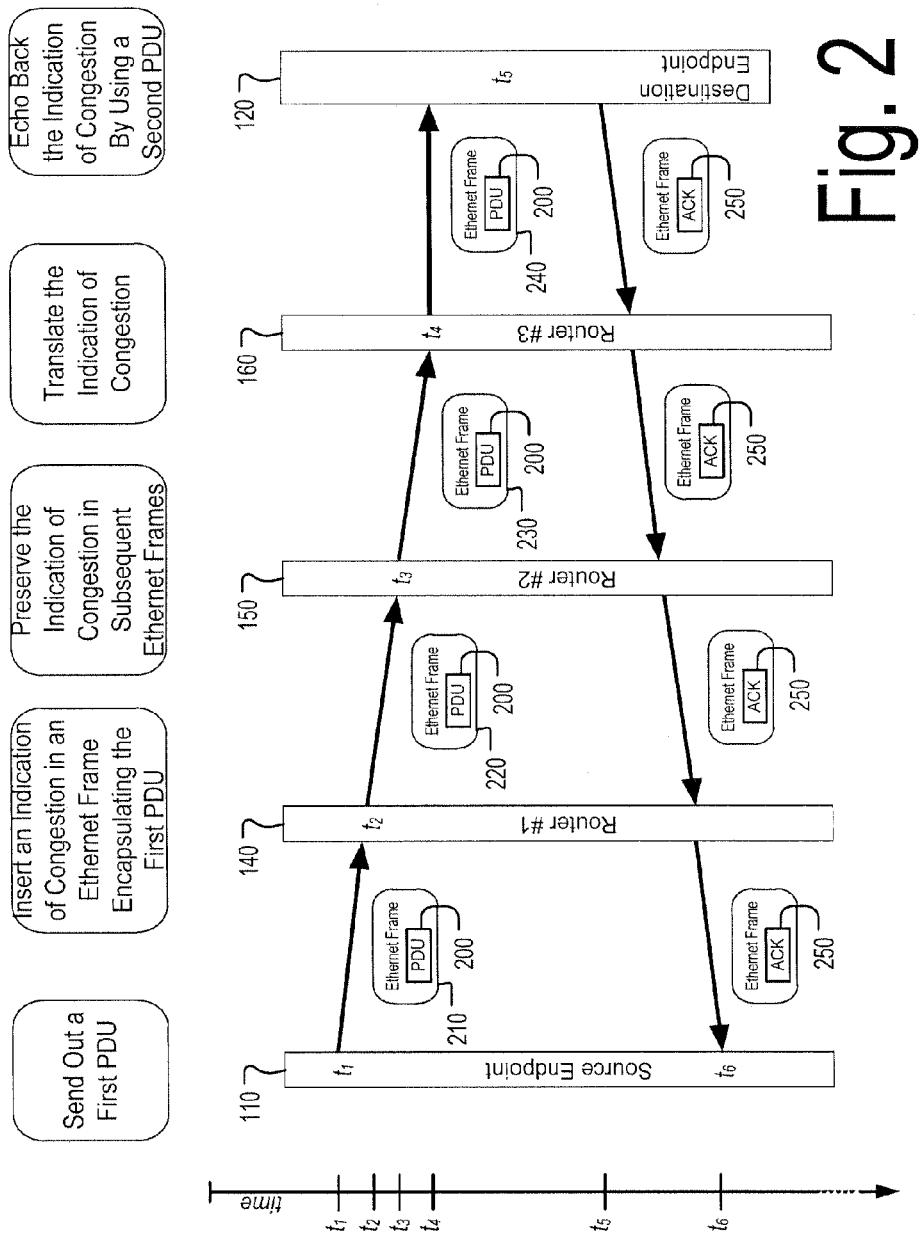
FIG. 2 depicts sequence diagram illustrating a congestion notification mechanism implemented by the communications network of FIG. 1.

FIG. 2 depicts a timing sequence diagram associated with a congestion notification mechanism in accordance with aspects of the disclosure. At time $t_1$, the source endpoint 110 may transmit a protocol data unit (PDU) 200 which is encapsulated in an Ethernet frame 210. At time $t_2$, the router 140 may receive and parse the Ethernet frame 210 to determine a next hop address for the PDU 200. In this example, the next-hop address is that of the router 150. The router 140 may then encapsulate the PDU 200 in an Ethernet frame 220 that is addressed to the router 150. Afterwards, the router 140 may examine its state to determine whether it is congested. Upon a positive determination, the router 140 may insert an indication of the congestion into a header field of the Ethernet frame 220 before transmitting it to the router 150. In the present example, the indication of congestion is inserted into the VLAN PRIORITY header field of the frame 220. The insertion may involve setting the VLAN PRIORITY field to equal "001."

At time $t_3$, the router 150 may receive and parse the Ethernet frame 220 to obtain a next hop address for the PDU 200. In this example, the next-hop address is that of the router 160. The router 150 may then encapsulate the PDU 200 in an Ethernet frame 230 that is addressed to the router 160. In addition, the router 150 may examine the frame 220 to determine whether it contains an indication of congestion. Upon a positive determination, the router 150 may copy the indication of congestion from the Ethernet frame 220 into the Ethernet frame 230 before transmitting it to the router 150. In the present example, the router 150 may copy the value of the VLAN PRIORITY header field of the frame 220 into the VLAN PRIORITY header field of the frame 230.

At time $t_4$, the router 160 may receive and parse the Ethernet frame 240 to obtain a next hop address for the PDU 200. The router 160 may then encapsulate the PDU 200 in an Ethernet frame 240 destined to the next hop addresses. Furthermore, the router 160 may determine whether the next hop address is that of the device identified in the PDU 200 as the PDU's 200 destination (e.g., the destination endpoint 120 in this example). Upon a positive determination, the router 160 may translate the indication of congestion contained in the frame 230 to a form compatible with the destination endpoint 120. In some aspects, the translation of the indication may involve transferring the indication of congestion into a header field different from the header field used to carry the indication of congestion in the frame 230. The transfer may be needed in instances where the destination endpoint 120, or its Ethernet adapter, is incapable of parsing the header field used to carry the indication of congestion in the Ethernet frame 230. In the present example, the indication of congestion may be copied from the VLAN PRIORITY field of the Ethernet frame 230 into the VLAN ID field of the Ethernet frame 240 before the frame 240 is transmitted to the destination endpoint 120. For example, when the value of the VLAN PRIORITY field is "001" the string "000000000001" or another value that is recognized by the endpoint 120 to indicate congestion, may be stored in the VLAN ID field.

At time $t_5$, the destination endpoint 120 may receive the Ethernet frame 240 and examine it to determine whether it contains an indication of congestion. Upon a positive determination, a PDU 250 may be obtained and an indication of congestion may be inserted in the PDU 250. The indication of congestion may be inserted in accordance with a congestion notification method supported by the protocol. In the present example, the PDU 200 may be an InfiniBand message used to carry a data payload and the PDU 250 may be an InfiniBand ACK message or an InfiniBand congestion notification packet (CNP), used to signal receipt of the PDU 200. Accordingly, the indication of congestion may be inserted in the PDU 250 by setting the Backward Explicit Congestion Notification (BECN) bit of the ACK message to "1." Once the indication of congestion is inserted, the PDU 250 may be transmitted to a sender of the PDU 200. (the sending endpoint 110 in this example.)

At time $t_6$, the source endpoint 110 may receive the PDU 250 and processes it to determine whether it contains an indication of congestion. Upon detecting the indication of congestion, the source endpoint 110 may take an anti-congestion measure, such as reducing the rate at which InfiniBand PDUs are transmitted over the Ethernet system 130 by the source endpoint 110.

Figure 3:
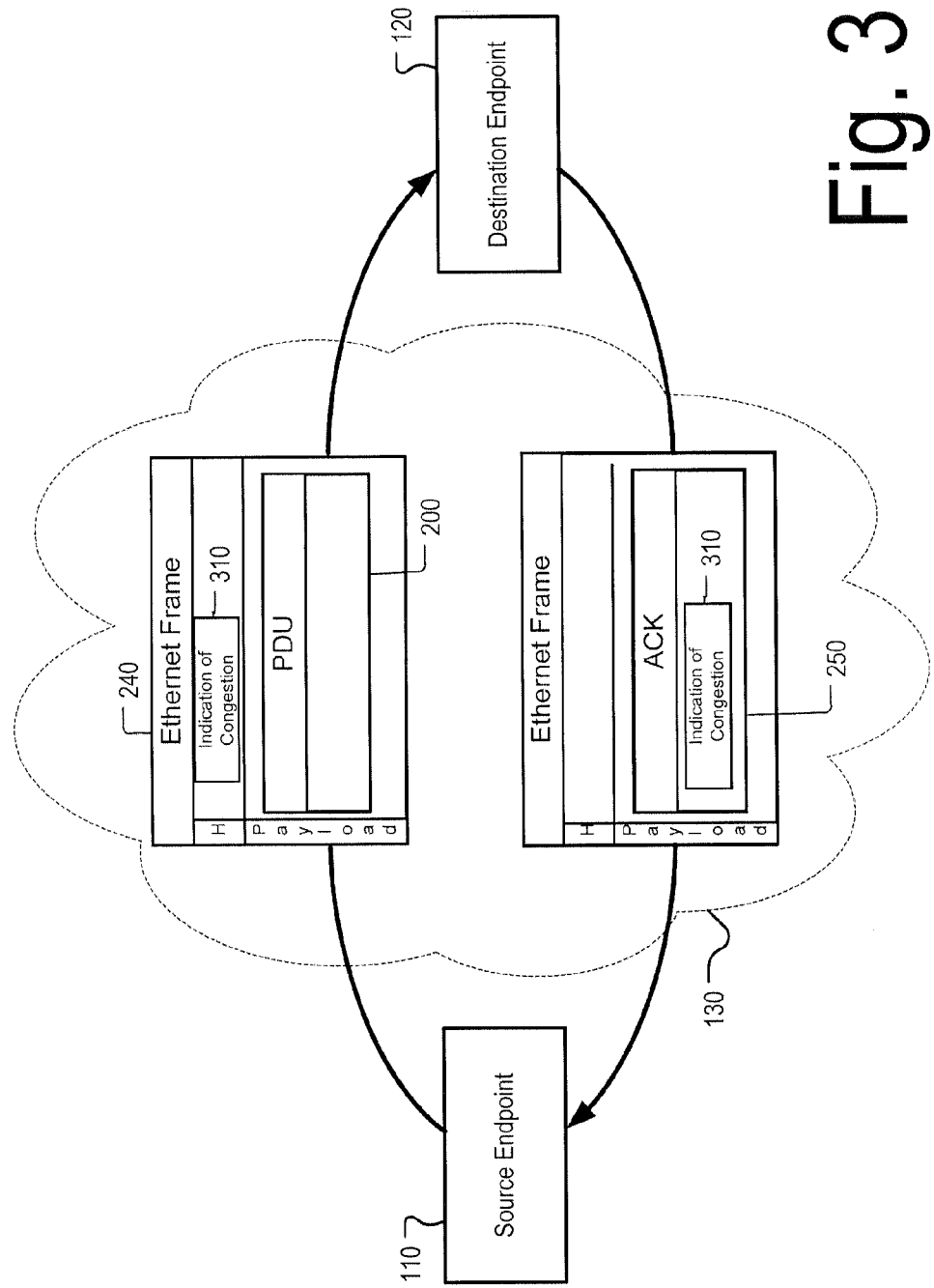
FIG. 3 depicts a schematic diagram illustrating aspects of the congestion notification mechanism of FIG. 2.

FIG. 3 depicts a schematic diagram further illustrating the congestion notification mechanism of FIG. 2. FIG. 3 depicts the PDU 200 travelling along a transmission path from the source endpoint 110 to the destination endpoint 120. The PDU 200 is depicted in FIG. 3 as being encapsulated inside the Ethernet frame 240. The Ethernet frame 240 may include a header portion and a payload portion. The payload portion may store the PDU 200, whereas the header portion may include the indication of congestion 310. The indication of congestion 310 may be a bit string that is one or more bits long. As discussed above, the indication of congestion 310 may indicate whether the congestion has been detected in the network 100. In some aspects, the indication of congestion may be stored in a particular bit field, such as the VLAN PRIORITY field or the VLAN ID field of the Ethernet frame 240. For example, when the value of the VLAN PRIORITY field is "001" this may be an indication that congestion has been detected. Alternatively, when the value of the VLAN PRIORITY field is anything else, this may be an indication that congestion has not been detected in the network 100.

In addition, FIG. 3 depicts the PDU 250 travelling in a direction opposite to the direction of PDU 200. The PDU 250 may be any protocol data unit of the same protocol as the PDU 200. In this example, the PDU 200 and PDU 250 are both InfiniBand messages, but in other examples they may be PDUs of any protocol above Ethernet in the OSI stack. Although, the PDU 200 and PDU 250 are both InfiniBand messages, they do not need to be the same type of message. In this example, the PDU 200 may be an Infiniband message used to carry data as its payload, whereas the PDU 250 may be an InfiniBand ACK message generated to acknowledge receipt of PDU 200.

The PDU 250, as illustrated, may also contain the indication of congestion 310. The indication of congestion in the PDU 250 may be inserted by the destination endpoint 120 in response to the destination endpoint 120 detecting that the Ethernet frame 240 is carrying an indication of congestion. For example, when the value of the VLAN PRIORITY field of the Etherent frame 240 is set to "001", the BECN bit of the PDU 250 may be set to "1", by the destination endpoint 120, in order to indicate that congestion has been detected in the network 100. Thus, in some aspects, the PDU 250 may be used, by the destination device 120, to communicate the indication of congestion 310 back to the sending device 110.

It should be noted that although in this example the PDU 250 is generated by the destination device 120, in other examples the PDU 250 may be generated by an intermediate node (e.g., switch) located on the path travelled by the Ethernet frame 240. In such instances, the PDU 250 may be an InfiniBand congestion notification packet (CNP) rather than an InfiniBand ACK message. Furthermore, although in the above example, the PDUs 200 and 250 are InfiniBand PDUs, in other examples the PDUs 200 and 250 may PDUs of another protocol, other than TCP, that is capable of using the Ethernet system 130 as a messaging fabric.

Figure 4:
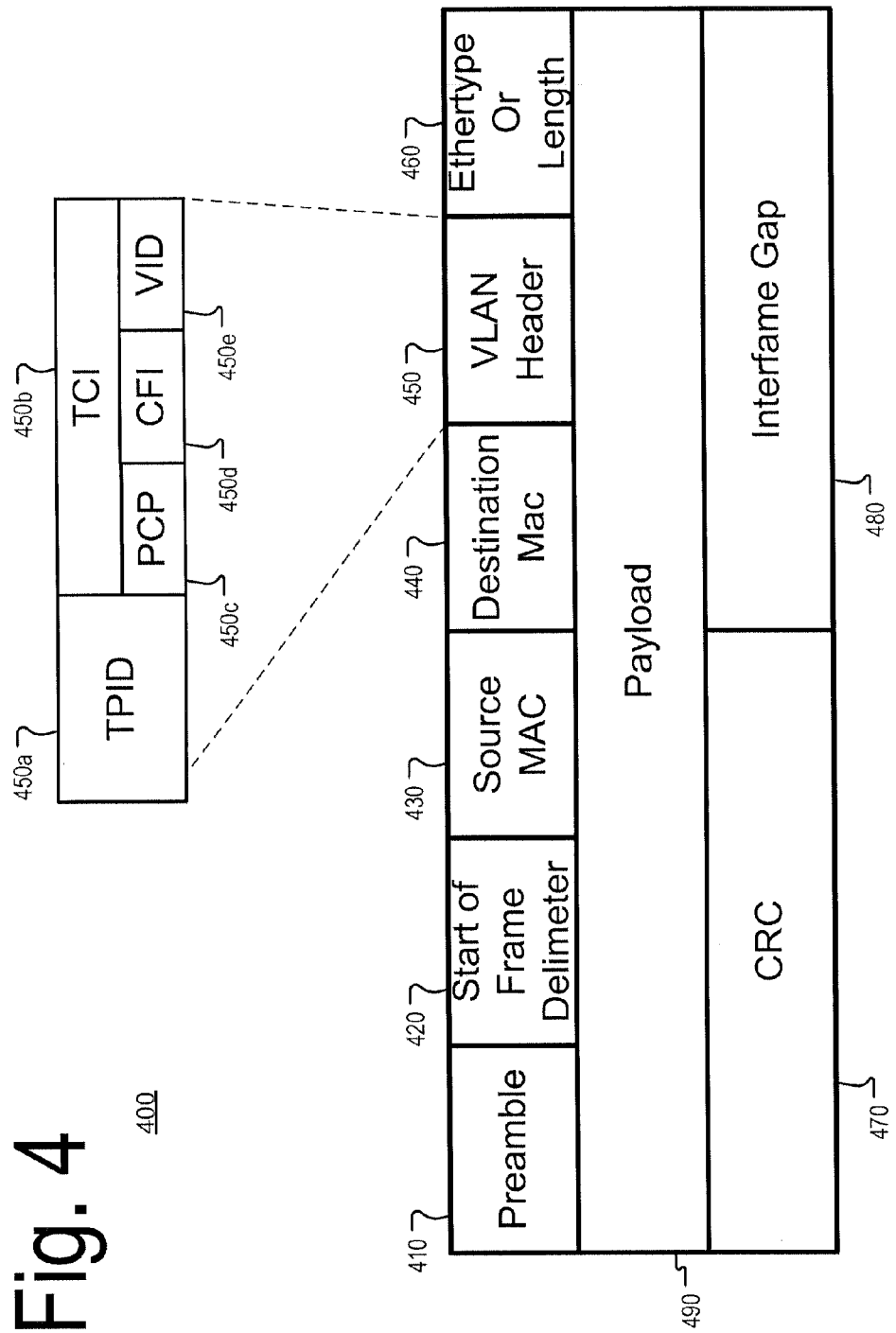
FIG. 4 depicts a schematic diagram of an Ethernet frame.

FIG. 4 depicts a schematic diagram of an Ethernet frame 400 that may be used to carry indications of congestion in accordance with aspects of the disclosure. The frame 400 may include a header having a preamble 410, start of frame delimiter 420, source address 430, destination address 440, VLAN 450 (herein referred to as "VLAN header"), and Ethertype 460. The frame 400 may also include a CRC 470, interframe gap 480, and payload 490. In particular, VLAN 450 may be a header designated for use in the creation of virtual networks. The VLAN 450 may include one or more fields 450a-e adapted to carry an indication of congestion in contravention to the purpose designated to the field by the Ethernet standard specification used to transmit Ethernet frames between endpoints 110 and 120. For instance, VLAN 450a is a tag protocol identifier field, VLAN field 450b is a tag control identifier field, VLAN 450c is a priority code point field (herein referred to as "VLAN PRIOIRITY header field"), VLAN 450d is a canonical format indicator field 152, and VLAN 450e is a VLAN identifier field (herein referred to as "VLAN ID header field").

It should be noted that the disclosure is not limited to using the VLAN 450 to carry indications of congestion. In some aspects, any header field in the Ethernet frame 400 may be adapted to carry indications of congestion provided that the value of that field does not affect the choices of next-hop nodes made by routers when routing the Ethernet frame 400 to its final destination. For example, the first (or last) N bits of the Source Mac 430 may be used to carry indications of congestion. For instance, in a local area network (LAN), such as the LAN in a data center, there may be a limited number of network nodes (e.g., 10000-50000) and therefore, not all bits in the Source Mac 430 may be needed to distinguish the nodes in the LAN from each other. Accordingly, the first or last N bits of the source MAC 430 may be utilized to carry indications of congestion and the remaining bits may be used to distinguish the nodes in the LAN from one another.

Figure 5:
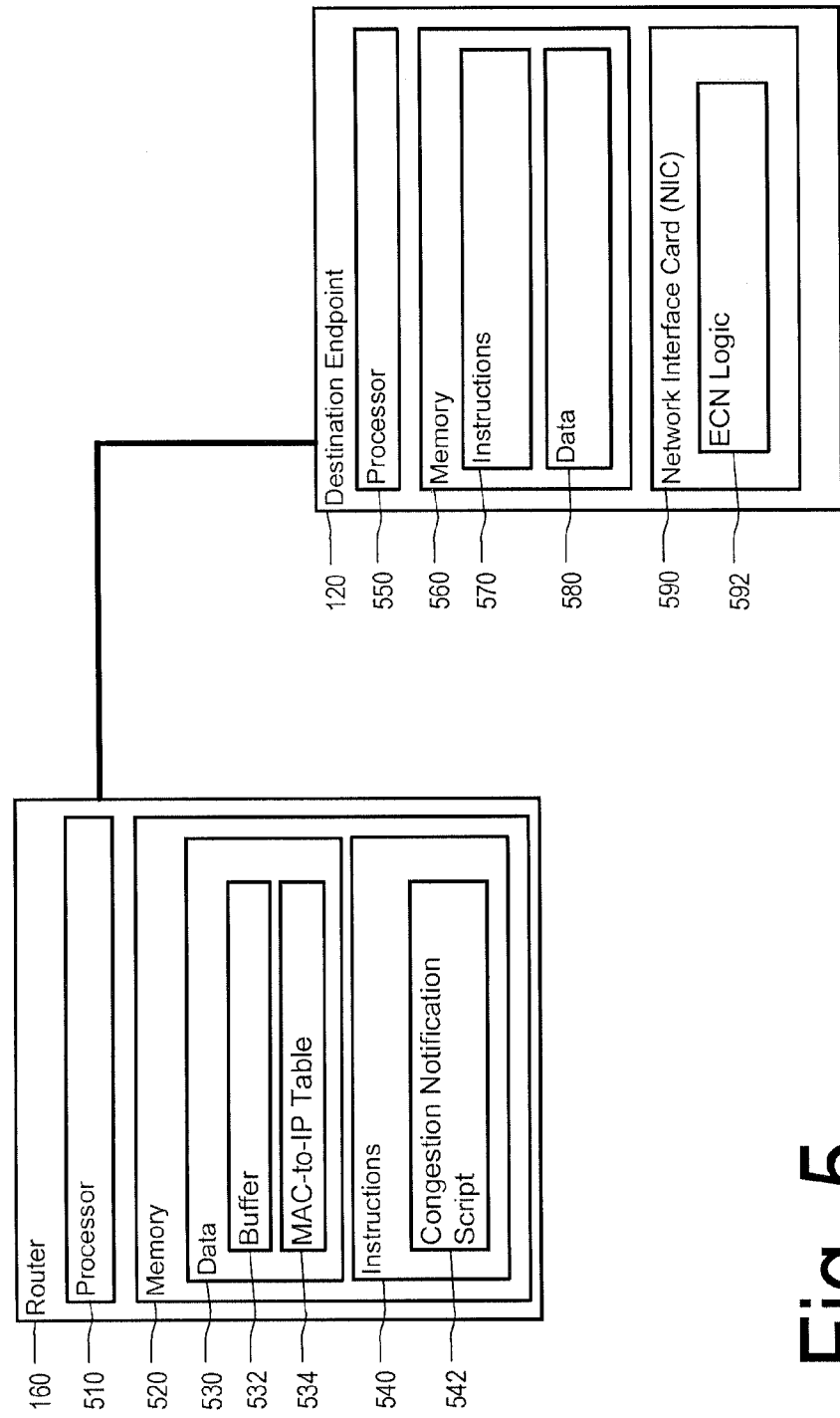
FIG. 5 depicts a schematic diagram of a portion of the communications network of FIG. 1.

FIG. 5 depicts an example of a portion of the system 100. In this example, the portion includes the router 160 and the destination endpoint 120. As illustrated, the router 160 may include a processor 510 and a memory 520. Memory 520 stores information accessible by processor 510, including instructions 530 that may be executed by the processor 510. Memory 520 also includes data 540 that may be retrieved, manipulated or stored by the processor. The memory may be of any type capable of storing information accessible by the processor, such as a hard-drive, memory card, ROM, RAM, DVD, CD-ROM, write-capable, and read-only memories. The processor 510 may be any well-known processor, such as commercially available processors. Alternatively, the processor may be a dedicated controller such as an ASIC.

Data 530 may be retrieved, stored or modified by processor 510 in accordance with the instructions 540. For instance, although the system and method is not limited by any particular data structure, the data may be stored in computer registers, in a relational database as a table having a plurality of different fields and records, or XML documents. The data may also be formatted in any computer-readable format such as, but not limited to, binary values, ASCII or Unicode. Moreover, the data may comprise any information sufficient to identify the relevant information, such as numbers, descriptive text, proprietary codes, pointers, references to data stored in other memories (including other network locations) or information that is used by a function to calculate the relevant data.

Buffer 532 may be a queue, or another data structure for storing Ethernet frames. The buffer 532 may store frames that are incoming to the router 160, or alternatively, it may store packets that are outgoing from the router 160. In some aspects, as discussed, the router 160 may be considered congested when the amount of data in the buffer 532 exceeds a predetermined threshold. For example, when the buffer 532 is one hundred percent full, there may be no room to store packets that are incoming to the router 160 resulting in those packets being dropped.

MAC-to-IP table 534 is a table relating MAC addresses of nodes in the network 140 to IP addresses assigned to those nodes. The table 534 may be used by the router 160 to determine whether the next hop address, for the PDU 200, is that of the final recipient of the PDU 200. (e.g., the destination endpoint 120 in this example.) For example, when the next-hop address (MAC) for the Ethernet frame 240 matches to the destination IP address identified inside the PDU 200, it may be determined that the recipient of the Ethernet frame 240 is the destination device to which the PDU 200 is directed. The table-to-IP may be stored in the memory 530, as a text file, binary file, and/or any type of data structure. It should be understood, that the disclosure is not limited to using the table 534 as the only way of determining whether the next hop address for the PDU 200 is that of the PDU's final recipient.

The instructions 540 may be any set of instructions to be executed directly (such as machine code) or indirectly (such as scripts) by the processor. In that regard, the terms "instructions," "steps" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below. The script 542 may include processor executable instructions that implement a method for explicit congestion notification, such as the one discussed with respect to FIG. 2. The script 542 may be configured to execute any one of the processes discussed with respect to FIGS. 6-12. In some aspects, the script may be implemented using Standard Access Control Lists (ACL) commands or other script language supported by the router 160.

Although, in this example, the processes discussed with respect to FIGS. 6-12 may be implemented, at least in part, using the script 542, in other example they may be implemented in hardware (e.g., by using an FPGA), or as a combination of software and hardware. For example, at least parts of any one of the processes discussed with respect to FIGS. 6-12 may be executed by hardware (e.g., controller) of a network adapter (not shown) of the router 160. Furthermore, although FIG. 5 provides an example of the structure of the router 160 only, it should be noted that the routers 140 and 150 may have identical structures. That is, each of the routers 140-150 may be configured to execute instances of the script 543 in order to insert indications of congestions in Ethernet frames. Notably, by using the script 532 each of the routers 140-160 may adapt, for use in congestion notification mechanism, an Ethernet header field that is designated a function unrelated to congestion control by the Ethernet standard specification used in the transmission of Ethernet frames between as the router 160 and destination endpoint 120.

The destination endpoint 120 may be a desktop computer, laptop, cell phone, smart phone, tablet PC, game console, or any other type of processor based device. Destination endpoint 120 may also comprise a plurality of computers, e.g., a load balanced server farm, that exchange information with different nodes of a network for the purpose of receiving, processing and transmitting data to the client devices. In this instance, the client devices will typically still be at different nodes of the network than any of the computers comprising destination endpoint 120. In the present example, the destination endpoint 120 is a desktop computer.

In one example, the destination endpoint 120 may include a processor 550, memory 560, instructions 570, and data 580, and network interface card 590. The processor may be an Intel x86 processor or any other commercially available general purpose processor. Furthermore, in some aspects, the processor 450 may be a special purpose processor, such as an FPGA. The memory 460, may be any volatile and non-volatile memory, such as RAM, ROM, CD-ROM, flash memory, and others. The instructions 570, stored in the memory 560, may be any set of instructions to be executed directly (such as machine code) or indirectly (such as scripts) by the processor. In that regard, the terms "instructions," "steps" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

Data 580 may be retrieved, stored or modified by processor 120 in accordance with the instructions 570. For instance, although the system and method is not limited by any particular data structure, the data may be stored in computer registers, in a relational database as a table having a plurality of different fields and records, or XML documents. The data may also be formatted in any computer-readable format such as, but not limited to, binary values, ASCII or Unicode. Moreover, the data may comprise any information sufficient to identify the relevant information, such as numbers, descriptive text, proprietary codes, pointers, references to data stored in other memories (including other network locations) or information that is used by a function to calculate the relevant data.

Network interface card (NIC) 590 may be a network interface adapter for sending and receiving communications over the Ethernet system 130. The NIC 590 may include a processor, a receiver, transmitter, or a transceiver (not shown) for sending and receiving Ethenet frames over a network. Furthermore, the NIC 590 may include Explicit Congestion Notification (ECN) Logic 592 for performing at least a part of the congestion control mechanism discussed with respect to FIG. 2. The logic 592 may be implemented as software that is executed by a controller (e.g., processor) that is part of the NIC 590 or, alternatively, it may be implemented in hardware or as a combination of software and hardware. Although, in this example, the logic 592 is implemented as part of the NIC 590, in other examples it may be implemented in software executed by the processor 550, hardware that is part of the endpoint device 120, but not part of the NIC 590, or as a combination of software and hardware. In any event, the logic 592 may implement at least a portion of one or more of the processes discussed with respect to FIGS. 6-12.

Figure 6:
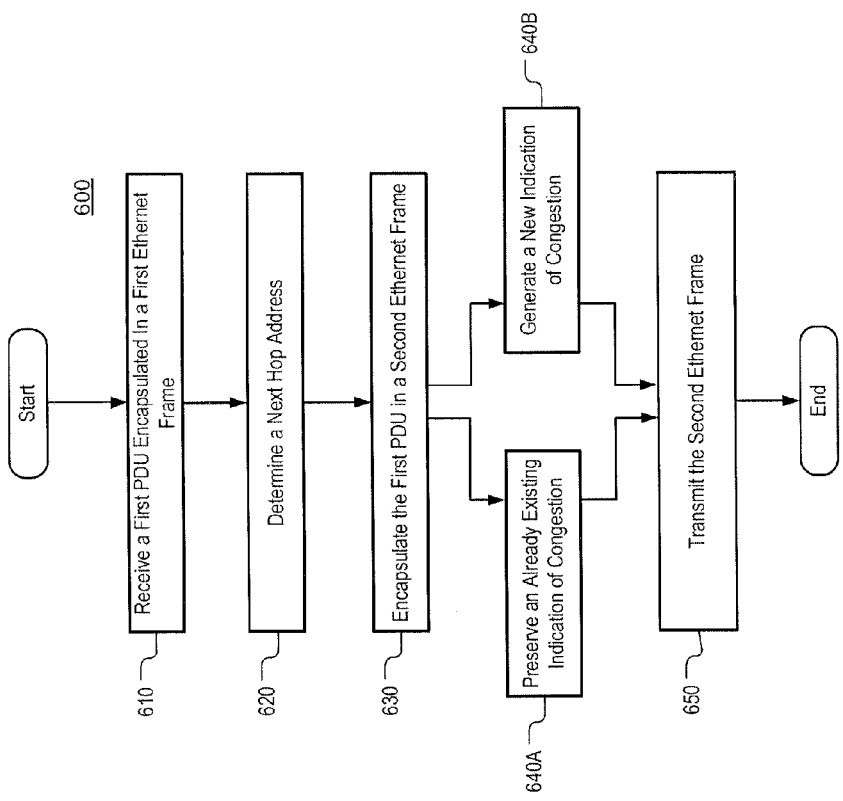
FIG. 6 depicts a flowchart of a process in accordance with aspects of the disclosure.

FIG. 6 depicts a flowchart of a process 600 in accordance with aspects of the disclosure. The process 600 may be executed by a node (e.g., router, bridge, hub) in the Ethernet system 130. At task 610, a first Ethernet frame encapsulating a PDU is received by a router executing the process 600. In the present example, the PDU may be an InfiniBand PDU that is transmitted by the source endpoint 110 to the endpoint 120. At task 620, the router consults a routing table and determines a next hop address for the PDU. At task 630, the router encapsulates the PDU in a second Ethernet frame. At task 640A, the router transfers an indication of congestion that is contained in the first Ethernet frame to the second Ethernet frame. At task 640B, the router 160 generates and inserts a new indication of congestion in the second Ethernet frame. In some aspects, only one, or both, of tasks 640A and 640B may be executed. At task 650, the router transmits the second Ethernet frame to another node in the network 100.

Figure 7:
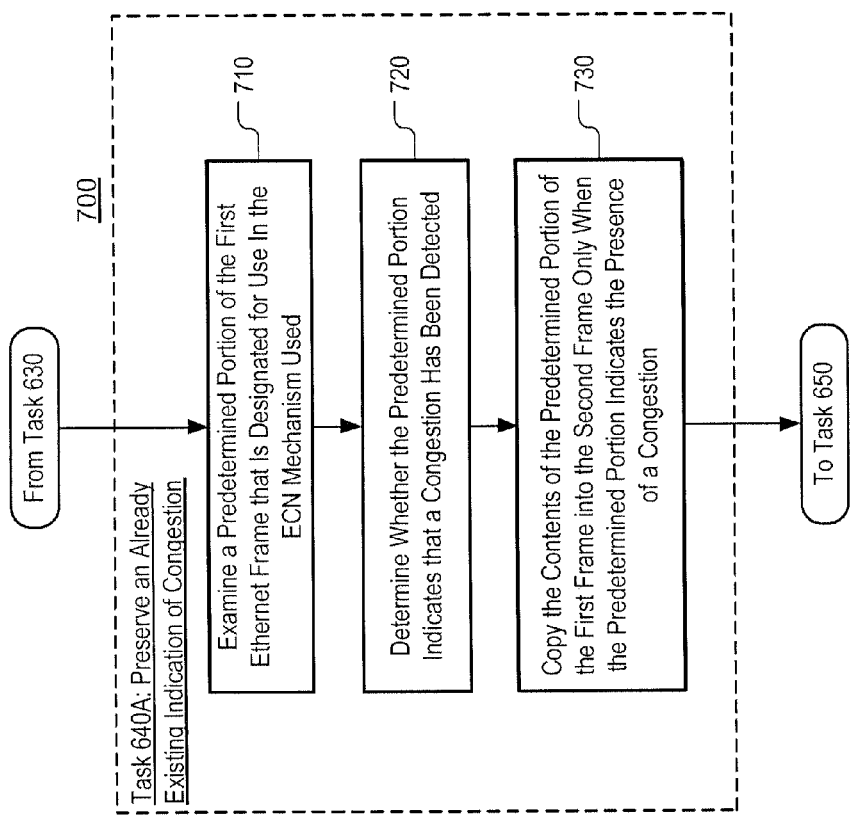
FIG. 7 depicts a flowchart of an example sub-process associated with FIG. 6.

FIG. 7 depicts a flowchart of a process 700 associated with preserving an indication of congestion present in the first Ethernet frame as specified by task 640A of FIG. 6. At task 710, the router executing the process 600 identifies a first predetermined portion of the first Ethernet frame that is used to signal the presence of congestion in the network 100. In the present example, the identified portion is the VLAN PRIORITY header field of the first Ethernet frame. At task 720, the router determines whether the value of the first predetermined portion indicates that congestion has been detected. In the present example, the VLAN PRIORITY field being equal to "001" indicates that congestion has been detected, while all other values indicate that no congestion has been detected. At task 730, upon detecting that the value of the first predetermined portion of the first (incoming) Ethernet frame indicates that congestion has been detected, the router executing the process 600 transfers the indication of congestion into the second (outgoing) Ethernet frame.

In one aspect, transferring the indication of congestion may include copying the value of the first predetermined portion of the first (incoming) Ethernet frame into the same portion of the second (outgoing) Ethernet frame. For example, the value of the VLAN PRIORITY header field of the second Ethernet frame may be set to equal the value of the VLAN PRIORITY header field of the first Ethernet frame. Alternatively, in another aspect, transferring the indication of congestion may include setting, a second predetermined portion in the second (outgoing) Ethernet frame, that is different from the first predetermined portion in the first (incoming) Ethernet frame, to a value that indicates congestion. For example, when the VLAN PRIORITY header field of the first Ethernet frame is equal to "001", the value of the VLAN ID, or another portion of the second Ethernet frame may be set to equal "01." In yet another aspect, transferring the indication of congestion may include translating the value of the first predetermined portion of the first Ethernet frame from a first format to a second format compatible with the device receiving the second Ethernet frame. For example, the value "001" of the VLAN PRIORITY field may be translated to "1" or "010" or any other string that is recognized by a recipient node as indicating the presence of congestion.

Figure 8:
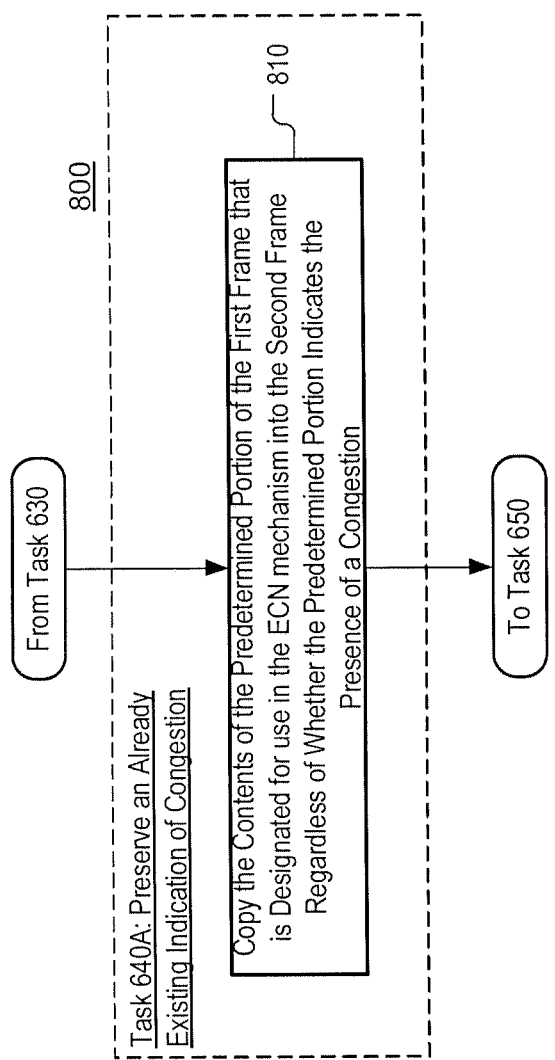
FIG. 8 depicts a flowchart of another example sub-process associated with FIG. 6.

FIG. 8 depicts a flowchart of an alternative process 800 associated with preserving an indication of congestion present in the first Ethernet frame as specified by task 640A of FIG. 6. At task 810, the contents of a predetermined portion of the of the first Ethernet frame is transferred into the second Ethernet frame, regardless of whether it indicates that a congestion has been detected. The predetermined portion is a portion of the Ethernet frame used to carry an indication of congestion. The transfer may be executed in the fashion discussed with respect to task 720. Unlike task 720, however, the transfer may be performed regardless of whether the value of the first predetermined portion indicates that congestion has been detected.

Figure 9:
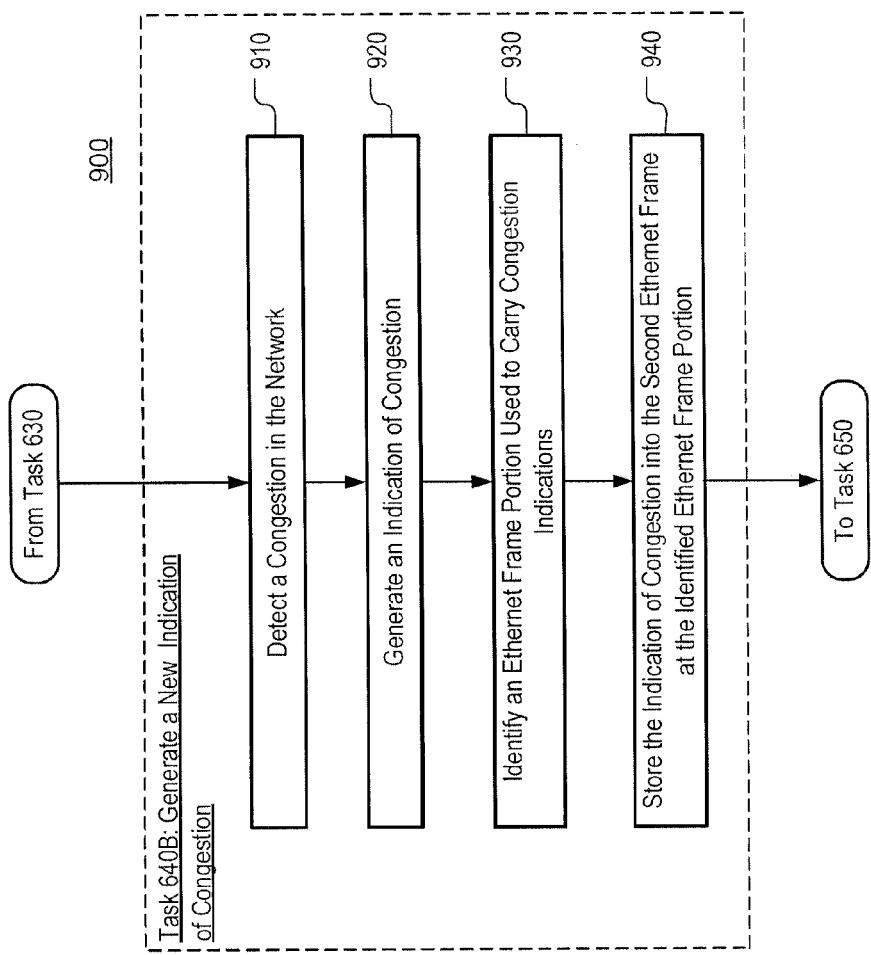
FIG. 9 depicts a flowchart of a yet another example sub-process associated with FIG. 6.

FIG. 9 depicts a flowchart of a process 900 associated with inserting a new indication of congestion into the second Ethernet frame, as specified by task 640B of FIG. 6. At task 910, the router executing the process 600 evaluates its state to determine whether it is congested. As noted above, the router may be congested when it is carrying so much data that its quality-of-service deteriorates. In one example, the router may determine that it is congested when the amount of data stored in a buffer of the router exceeds a predetermined threshold (e.g., 10 MB or 95% of the routers capacity). In another example, the router may determine that it is congested when the number of PDUs stored in the queue exceeds a predetermined threshold (e.g., 100 PDUs). The buffer may be a queue for storing incoming packets, a queue for storing outgoing packets, or any other data structure for storing packets that are transmitted or received by the router executing the process 600. It should be noted that the disclosure is not limited to any specific criterion for what constitutes congestion.

At task 920, in response to detecting that it is congested, the router generates an indication of congestion. The indication of congestion may be a bit string that is one or more bits long. In one example, the indication of congestion may be a single bit, where "1" indicates that congestion has been detected and "0" indicates that no congestion has been detected. In one aspect, the indication of congestion may identify the router that is congested (e.g., router 160), or an identifier for an InifiniBand connection associated with the PDU encapsulated inside the first Ethernet frame (e.g., PDU 200). For example, when the indication of congestion is the bit string "000000000000" this may be an indication that no congestion is detected, any other value may indicate that node identified by the binary digit, that the string constitutes, is congested. In yet another aspect, the indication of congestion may be an identifier of an InfiniBand channel (or another connection or data stream) that the PDU, which is encapsulated inside the first Etherent frame, is part of. For example, when the VLAN ID field is set to "000000000000" this may be an indication that no congestion is detected, and when the value is "0000000000100" that Infiniband channel identified with the number 8 is disrupted by a network congestion.

At task 930, an Ethernet frame portion that is used to carry indications of congestion is determined. By way of example, determining the Ethernet frame portion may involve retrieving from a memory an identifier for that portion. In some aspects, the Ethernet frame portion may be a header field, such as the VLAN PRIORITY OR VLAN ID field of Ethernet frames. In other aspects, the Ethernet frame portion may be a part of a header field, such as the first 5-bits of the frame's Source MAC field. At task 940, the router may insert the indication of congestion generated at task 920 into the second Ethernet frame by setting the portion determined at task 930, in the second Ethernet frame, to equal the generated indication of congestion. In the present example, the value of VLAN PRIORITY field of the second Ethernet frame may be set to equal the generated indication of congestion.

Figure 10:
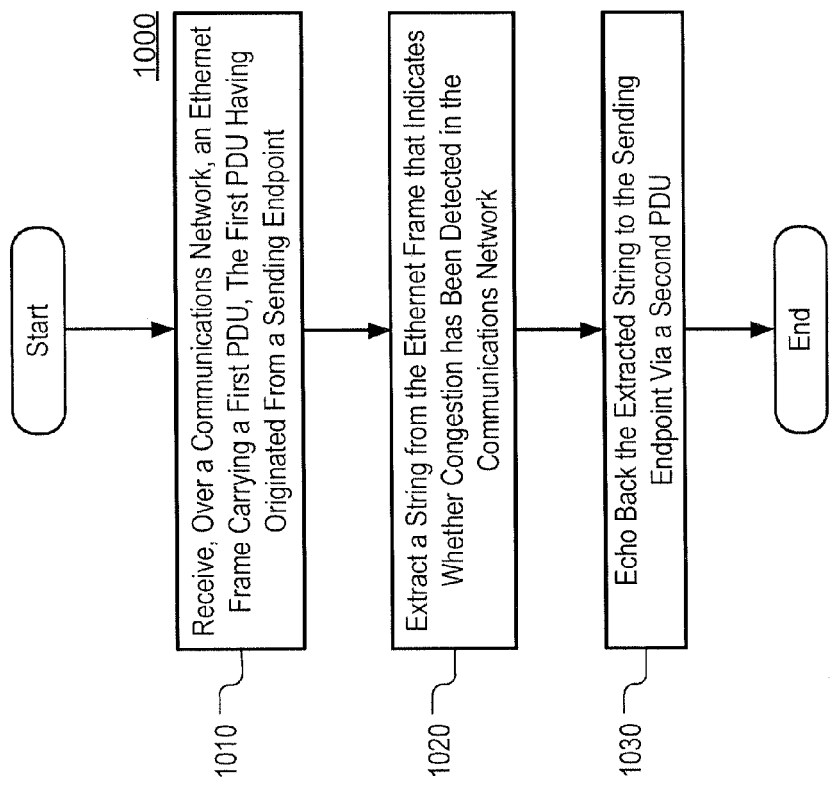
FIG. 10 depicts a flowchart of another process in accordance with aspects of the disclosure.

FIG. 10 depicts a flowchart of a process 1000 that is associated with echoing detections of congestions to endpoints and other nodes in the network 100. The process 1000 may be executed by an intermediate node in the network 100, such as one of the routers 140-160 or by an endpoint, such as the destination endpoint 120. At task 1010, the node that executes the process 1000 receives an Ethernet frame encapsulating a first PDU. The first PDU may have been be transmitted by the sending endpoint 110 over the Ethernet system 130. The first Ethernet frame may include a string that indicates whether congestion in the network 100 has been detected. As discussed above, the string may be the value of the VLAN PRIORITY header field or another portion of the Ethernet frame. At task 1020, the node extracts the string from the first Ethernet frame. At task 1030, the node echoes the extracted string back to the sending endpoint 110. Task 1030 is further discussed with respect to FIGS. 11 and 12.

Figure 11:
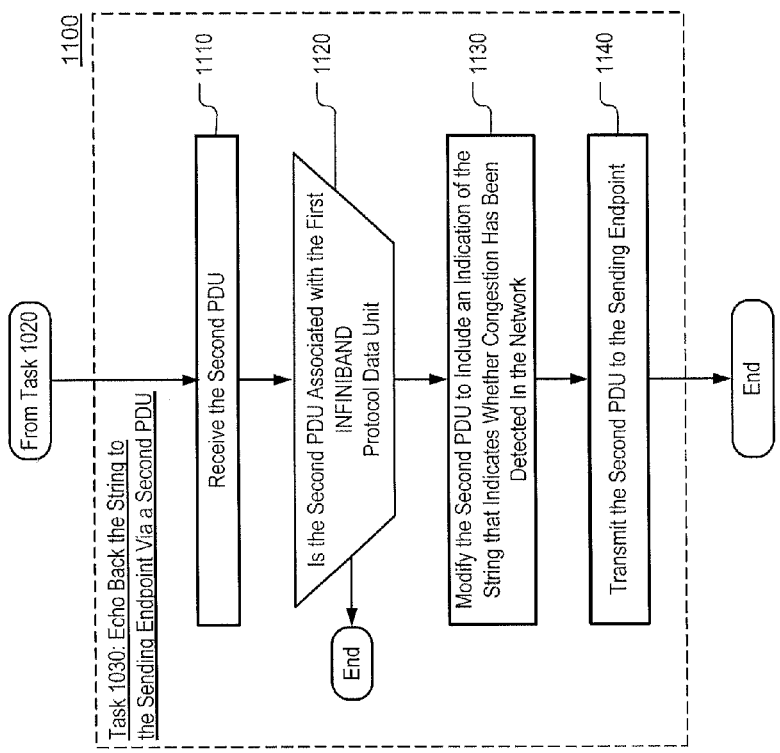
FIG. 11 depicts a flowchart of an example sub-process associated with FIG. 10.

FIG. 11 depicts a flowchart of a process 1100 associated with echoing back the string that indicates whether a congestion has been detected in the network 100 as specified by task 1030 of FIG. 10. At task 1110, a second PDU is received at the node executing the process 1000. The second PDU may be of the same network protocol as the first PDU. In the present example, both PDUs are InfiniBand PDU's, but in other examples they may be PDUs of any protocol above Ethernet in the OSI stack. In instances where the process 1000 is executed by an intermediate network node, such as a router, the second PDU may be received from another network node (e.g., router, sending endpoint) as part of the transmission of the second PDU along a transmission path. That is, the second PDU may be intercepted midway between its origination point and its destination. Alternatively, in instances where the process 1000 is executed by the NIC 490, the second PDU may be received from application-layer software via a system call instructing the NIC 490 to transmit the second PDU.

At task 1120, the node executing the process 1000 performs a test to determine whether the second PDU is associated with the first PDU. If they are, the second PDU is deemed suitable to carry an indication of the string extracted at task 1020 and task 1130 is performed. If however the test is failed, the execution of the process 1100 is discontinued. In some aspects, the test may be based on a variety of criteria. For example, second PDU may be considered associated with the first PDU if it is directed to the sender of the first PDU received at task 1010 (e.g., the final destination of second PDU is the originating node of first PDU). Similarly, in some aspects, the second PDU may be considered associated with the first PDU if the second PDU is part of the same InfiniBand channel (or communications session) as the first PDU.

At task 1130, the second PDU is modified to include an indication of the string, extracted from the first Ethernet frame at task 1020, that informs whether congestion has been detected in the network 100. In some aspects, the second PDU may be modified in accordance with a congestion notification mechanism that is implemented by the protocol of the second PDU. That is, the indication of congestion may be inserted in a header field that is designated by the protocol of the second PDU to signal the presence of network congestion. In the present example, because the second PDU is an InfiniBand PDU, the value of the Back-Explicit Congestion Notification (BECN) bit may be set to "1."

In some instances, one or more of tasks 1110-1130 may be executed only when the string in the first Ethernet frame indicates that congestion has been detected. Alternatively, one or more of tasks 1110-1130 may be executed regardless of whether the string in the first frame indicates the presence of congestion. For example, the NIC 490 may insert an indication of the first string in every PDU that is found to be associated with the first PDU. The indication of the first string may be a copy of the first string or a translation of the first string that conforms to a congestion notification mechanism used by the protocol of the associated PDUs.

Figure 12:
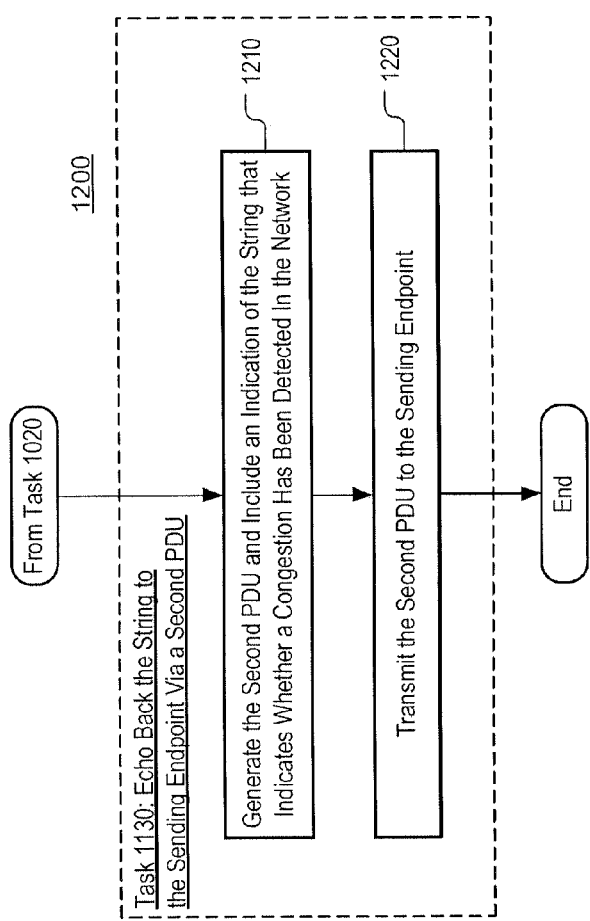
FIG. 12 depicts a flowchart of an example sub-process associated with FIG. 10.

FIG. 12 depicts a flowchart of a process 1200 associated with echoing back the string that indicates whether a congestion has been detected in the network 100 as specified by task 1030 of FIG. 10. At task 1210, a second PDU is generated by the device executing the process 1000 and an indication of the string extracted at task 1020, that informs whether congestion has been detected in the network, is inserted in the second PDU. The second PDU may be of the same protocol as the first PDU. In some aspects, the indication of congestion may be inserted in accordance of the protocol of the second PDU as discussed with respect to task 1130. At task 1220, the second PDU is transmitted to the sender of the first PDU. In some instances, one or more of tasks 1210-1220 may be executed only when the string in the first Ethernet frame indicates that congestion has been detected. Alternatively, one or more of tasks 1210-1220 may be executed regardless of whether the string in the first frame indicates the presence of congestion.

FIGS. 6-12 are provided as examples. At least some of the tasks associated with FIGS. 6-12 may be performed in a different order than represented, performed concurrently or omitted altogether. Although, in the above examples PDU 200 and PDU 250 are of the same protocol, in other examples they may be data units of different protocols. Moreover, although in the above examples, indications of congestions are echoed back to the sender of the PDU 200, in other examples they may be transmitted to any other node in the network 100, such as another endpoint that is transmitting data over the network. In addition, although in the present example, indications of congestions are inserted in Ethernet frames (e.g. at times $t_2$-$t_4$ in FIG. 2), the disclosure is not limited to the Ethernet protocol only, and in other examples, indications of congestions may be inserted in the frames of any data-link layer protocol. Furthermore, although in the above examples, the indications of congestion that are contained in the header portion of Ethernet frames are echoed back inside InfiniBand protocol data units, in other examples, the indications of network congestion may be inserted in protocol data units from any protocol other than the Transport Control Protocol (TCP).

As these and other variations and combinations of the features discussed above can be utilized without departing from the subject matter as defined by the claims, the foregoing description of exemplary aspects should be taken by way of illustration rather than by way of limitation of the subject matter as defined by the claims. It will also be understood that the provision of the examples described herein (as well as clauses phrased as "such as," "e.g.", "including" and the like) should not be interpreted as limiting the claimed subject matter to the specific examples; rather, the examples are intended to illustrate only some of many possible aspects.

The invention claimed is:

1. An apparatus for receiving and transmitting data over a communications network, the apparatus comprising:
   a transmitter;
   a receiver configured to receive a first protocol data unit (PDU), over the communications network, the first PDU having been transmitted by a source node to a destination node;
   a memory including:
   (i) a buffer for storing protocol data units (PDUs), and
   (ii) one or more processor-executable instructions for modifying a predetermined header field of an Ethernet frame to carry indications of congestion in accordance with a congestion notification mechanism;
   a processor coupled to the memory, the transmitter, and the receiver, the processor being configured to:
   identify a communications network node located on a path from the source node to the destination node;
   encapsulate the first PDU in a first Ethernet frame, the first Ethernet frame having a first header portion;
   detect that an amount of data stored in the buffer exceeds a threshold;
   in response to detecting the amount of data exceeds a threshold, insert an indication of congestion in the first predetermined header field of the first Ethernet frame, the indication of congestion being inserted by executing the one or more processor-executable instructions;
   provide to the transmitter the first Ethernet frame for transmission to the identified communications network node;
   receive a second PDU;
   transfer the indication of network congestion from the first field of the first Ethernet frame to a second header field of the second PDU;
   encapsulate the second PDU in a second Ethernet frame; and
   provide to the transmitter the second Ethernet frame for transmission to a next communications network node on a transmission path leading to the sending device.

2. The apparatus of claim 1, wherein the first predetermined header field is adapted for use in the congestion notification mechanism through the execution of the one or more processor-executable instructions.

3. The apparatus of claim 1, wherein the first predetermined header field is selected for use in the congestion notification mechanism based on not being used in the identification of the communications network node.

4. The apparatus of claim 1, wherein the first predetermined header field is designated, in an Ethernet protocol standard used for the transmission of the first Ethernet frame by the apparatus, for a use that is unrelated to congestion notification.

5. The apparatus of claim 1, wherein:
the apparatus is a router; and
the processor-executable instructions are Access Control List (ACL) rules.

6. The apparatus of claim 1, wherein the first predetermined header field is a field in a VLAN header of the first Ethernet frame.

7. The apparatus of claim 1, wherein the receiver and transmitter are integrated together in a single transceiver unit.

8. An apparatus for receiving and transmitting data over a communications network, the apparatus comprising: a transmitter; a receiver configured to receive, over the communications network, a first Ethernet frame encapsulating a protocol data unit (PDU), the PDU having been transmitted by a source node to a destination node; a processor coupled to the transmitter and the receiver,
the processor being configured to: identify a communications network node located on a path from the source node to the destination node; encapsulate the PDU into a second Ethernet frame; identify a first header field in the first Ethernet frame,
the first header field being adapted for use in a congestion notification mechanism, the first header field being of a first type; transfer indication of network congestion from the first header field to a second header field in the second Ethernet frame, the second header field also being of the first type; and provide to the transmitter the Ethernet frame for transmission to the identified communications network node;
wherein the first header field in the first Ethernet frame is designated, in an Ethernet protocol standard used in the transmission of the first Ethernet frame and the second Ethernet frame, for a use that is unrelated to congestion notification.

9. The apparatus of claim 8, wherein the first header field is a VLAN PRIORITY header field and the second header field is a VLAN PRIORITY header field.

10. The apparatus of claim 8, wherein the processor is further configured to determine whether the indication of network congestion is in the first header field; wherein the indication of network congestion is transferred to the second header field only when the indication of network congestion is determined to be in the first header field.

11. The apparatus of claim 8, wherein the portion of the first header field adapted for use in the congestion notification mechanism is transferred to the second header field regardless of whether the indication of network congestion is in the portion.

12. The apparatus of claim 8, wherein the first header field is adapted for use in the congestion notification mechanism through the execution of the one or more processor-executable instructions by the processor, the instructions being stored in a memory of the apparatus.

13. The apparatus of claim 8, wherein the first header field is selected for use in the congestion notification mechanism based on not being used in the identification of the network node by the processor.

14. The apparatus of claim 8, wherein the processor is further configured to:
determine whether the identified communications network node and the destination device are the same device; and
when it is determined that the destination device is the same as the identified communications network node, transfer the indication of network congestion from the first header field in the first Ethernet frame to a third header field in the second Ethernet frame, the third header field being of a second type different from the first type;
wherein the indication of network congestion is transferred to the second header field only when it is determined that the identified communications network node and
the destination device are different devices.

15. The apparatus of claim 8, wherein only a portion of the first header field is adapted for use in the congestion notification mechanism.

16. The apparatus of claim 8, wherein the receiver and transmitter are integrated together in a single transceiver unit.

17. An apparatus for receiving and transmitting data over a communications network, the apparatus comprising:
a transmitter;
a receiver configured to receive, over the communications network, a first Ethernet frame encapsulating a first protocol data unit (PDU) of a first protocol, the first PDU being transmitted by a sending device;
a processor coupled to the transmitter and the receiver, the processor being configured to:
detect an indication of network congestion in a first header field of the first Ethernet frame;
obtain a second PDU addressed to the sending device, the second PDU also being of the first protocol;
transfer the indication of network congestion from the first field of the first Ethernet frame to a second header field of the second PDU;
encapsulate the second PDU in a second Ethernet frame; and
provide to the transmitter the second Ethernet frame for transmission to a next communications network node on a transmission path leading to the sending device.

18. The apparatus of claim 17 wherein the first header field is designated, in an Ethernet protocol standard, for use that is unrelated to congestion notification.

19. The apparatus of claim 17, wherein the second header field in the second PDU is designated, by a standard specification for the first protocol, to carry indications of congestion.

20. The apparatus of claim 17, wherein the apparatus is a router, and the processor is further configured to:
receive the second PDU;
determine that the second PDU is associated with the first PDU; and
wherein the indication of network congestion is transferred only when it is determined that the second PDU is related to the first PDU.

21. The apparatus of claim 17, wherein:
the first protocol is the InfiniBand protocol;
the first header field of the first Ethernet frame is a VLAN header field; and
the second header field of the second PDU is a Backward Explicit Congestion Notification (BECN) bit field.

22. The apparatus of claim 17, wherein:
obtaining the second PDU includes generating the second PDU;
the second PDU is one of an InfiniBand ACK message and an InifiniBand CNP message; and
the second header field of the second PDU is a Backward Explicit Congestion Notification (BECN) bit field.

23. The apparatus of claim 17, wherein the receiver and transmitter are integrated together in a single transceiver unit.

24. A network interface adapter for receiving and transmitting data over a communications network, the network interface adapter comprising logic configured to:
- receive, over the communications network, a first Ethernet frame encapsulating a first protocol data unit (PDU) of a first protocol, the first PDU being transmitted by a sending device;
- detect an indication of network congestion in a first header field of the first Ethernet frame;
- obtain a second PDU addressed to the sending device, the second PDU also being of the first protocol;
- transfer the indication of network congestion from the first header field to a second header field in the second PDU;
- encapsulate the second PDU in a second Ethernet frame; and
- transmit the second Ethernet frame to a node in the communications network, the node being part of a transmission path leading to the sending device.

25. The network interface adapter of claim 24, wherein the first header field is designated, in an Ethernet protocol standard, for use that is unrelated to congestion notification.

26. The network interface adapter of claim 24, wherein the second header field in the second PDU is designated, by a standard specification for the first protocol, to carry indications of congestion.

27. The network interface adapter of claim 24, wherein:
the first protocol is the InfiniBand protocol;
the first header field of the first Ethernet frame is a VLAN header field; and
the second header field of the second PDU is a Backward Explicit Congestion Notification (BECN) bit field.

28. The network interface adapter of claim 24, wherein:
obtaining the second PDU includes generating the second PDU;
the second PDU is one of an InfiniBand ACK message and an IniﬁniBand CNP message; and
the second header field of the second PDU is a Backward Explicit Congestion Notification (BECN) bit field.

29. A method for transmitting data over a communications network, the method comprising: receiving, over the communications network, a first Ethernet frame encapsulating a protocol data unit (PDU), the PDU having been transmitted by a source node to a destination node; identifying a communications network node located on a path from the source node to the destination node; encapsulating the PDU into a second Ethernet frame; identifying a first header field in the first Ethernet frame, the first header field being adapted for use in a congestion notification mechanism; transferring indicating of network congestion from the first header field in the first Ethernet frame to a second header field in the second Ethernet frame; and transmitting the second Ethernet frame to the communications network node; wherein the first header field in the first Ethernet frame is designated, in an Ethernet protocol standard, for a use that is unrelated to congestion notification.

30. The method of claim 29, wherein the first header field is a VLAN PRIORITY header field and the second header field is a VLAN PRIORITY header field.

31. The method of claim 29, further comprising determining whether the indication of network congestion is in the first header field;
wherein the indication of network congestion is transferred to the second header field only when the indication of network congestion is determined to be in the first header field.

32. The method of claim 29, wherein only a portion of the first header field is adapted for use in the congestion notification mechanism and the portion is transferred to the second header field regardless of whether the indication of network congestion is in the portion.

33. The method of claim 29, wherein the first header field is selected for use in the congestion notification mechanism based on not being used in the identification of the network node.

34. A method for receiving and transmitting data over a communications network, the method comprising:
- receiving, over the communications network, a first Ethernet frame encapsulating a first protocol data unit (PDU) of a first protocol, the first PDU being transmitted by a sending device;
- detecting an indication of network congestion in a first header field of the first Ethernet frame;
- obtaining a second PDU addressed to the sending device, the second PDU also being of the first protocol;
- transferring the indication of network congestion from the first header field to a second header field in the second PDU;
- encapsulating the second PDU in a second Ethernet frame; and
- transmitting the second Ethernet frame to a node in the communications network, the node being part of a transmission path leading to the sending device.

35. The method of claim 34, wherein the first header field is designated, in an Ethernet protocol standard, for use that is unrelated to congestion notification.

36. The method of claim 34, wherein the second header field in the second PDU is designated, by a standard specification for the first protocol, to carry indications of congestion.

37. The method of claim 34, wherein:
the first protocol is the InfiniBand protocol;
the first header field of the first Ethernet frame is a VLAN header field; and
the second header field of the second PDU is a Backward Explicit Congestion Notification (BECN) bit field.

38. The method of claim 34, wherein:
obtaining the second PDU includes generating the second PDU;
the second PDU is an InfiniBand ACK message; and
the second header field of the second PDU is a Backward Explicit Congestion Notification (BECN) bit field.

\* \* \* \* \*